(12) United States Patent
Harkness et al.

(10) Patent No.: US 8,367,266 B2
(45) Date of Patent: Feb. 5, 2013

(54) CATALYST LAYER

(75) Inventors: Ian Roy Harkness, Oxford (GB); Jonathan David Brereton Sharman, Reading (GB); Edward Anthony Wright, Reading (GB)

(73) Assignee: Johnson Matthey Fuel Cells Limited, London (GB)

( * ) Notice: Subject to any disclaimer, the term of this patent is extended or adjusted under 35 U.S.C. 154(b) by 488 days.

(21) Appl. No.: 12/665,824

(22) PCT Filed: Jun. 19, 2008

(86) PCT No.: PCT/GB2008/050467
§ 371 (c)(1),
(2), (4) Date: Dec. 21, 2009

(87) PCT Pub. No.: WO2008/155580
PCT Pub. Date: Dec. 24, 2008

(65) Prior Publication Data
US 2010/0190086 A1    Jul. 29, 2010

(30) Foreign Application Priority Data
Jun. 20, 2007    (GB) .................................. 0711882.1

(51) Int. Cl.
| | |
|---|---|
| H01M 4/02 | (2006.01) |
| H01M 4/36 | (2006.01) |
| H01M 4/90 | (2006.01) |
| H01M 4/92 | (2006.01) |
| H01M 4/94 | (2006.01) |
| H01M 8/10 | (2006.01) |
| C22C 5/02 | (2006.01) |
| C22C 5/04 | (2006.01) |
| C22C 5/06 | (2006.01) |

(52) U.S. Cl. ........ 429/483; 429/480; 429/452; 429/523; 429/524; 429/525; 429/526; 420/461; 420/463; 420/465; 420/466; 420/467; 420/468; 420/501; 420/505; 420/507; 420/508; 420/509; 420/510; 420/511

(58) Field of Classification Search ................. 429/480, 429/483, 485, 523–526; 420/461–463, 465–468, 420/501, 505, 507–511
See application file for complete search history.

(56) References Cited

U.S. PATENT DOCUMENTS
(Continued)

FOREIGN PATENT DOCUMENTS
| | | |
|---|---|---|
| EP | 0 569 062 A2 | 11/1993 |
| EP | 0 569 062 A3 | 11/1993 |

(Continued)

OTHER PUBLICATIONS

"High-Resolution Scanning Transmission Electron Tomography and Elemental Analysis of Zeptogram Quantities of Heterogeneous Catalyst," Paul A. Midgley et al. J. Phys. Chem. B (2004), 108, pp. 4590-4592.*

(Continued)

Primary Examiner — Patricia L Hailey
(74) Attorney, Agent, or Firm — RatnerPrestia (57) ABSTRACT

A porous catalyst layer formed from discrete particles of unsupported metal, wherein at least 80%, suitably at least 90%, of the discrete particles have a mass of from 1 to 1000 zeptograms, and wherein the catalyst layer has a metal volume fraction of less than 30% and a metal loading of less than 0.09 mg/cm$^2$ is disclosed. The catalyst layer is suitable for use in fuel cells and other electrochemical applications.

14 Claims, 5 Drawing Sheets

Particle Size Distribution from which a Processed Platinum Black layer is Prepared

U.S. PATENT DOCUMENTS

| | | | |
|---|---|---|---|
| 6,967,038 B2 * | 11/2005 | O'Brien | 427/115 |
| 7,608,358 B2 * | 10/2009 | Ye | 429/535 |
| 7,842,733 B2 * | 11/2010 | Gourdoupi et al. | 521/27 |
| 2002/0034675 A1 | 3/2002 | Starz et al. | |
| 2003/0104266 A1 | 6/2003 | Dearnaley et al. | |
| 2003/0186109 A1 | 10/2003 | Huang et al. | |
| 2004/0087441 A1 | 5/2004 | Bock et al. | |
| 2006/0030481 A1 | 2/2006 | LaBarge et al. | |
| 2006/0204831 A1 | 9/2006 | Yan et al. | |
| 2008/0187813 A1 * | 8/2008 | Ye | 429/40 |
| 2011/0212386 A1 * | 9/2011 | Roller et al. | 429/524 |

FOREIGN PATENT DOCUMENTS

| | | |
|---|---|---|
| EP | 0 875 524 A2 | 11/1998 |
| EP | 0 875 524 A3 | 11/1998 |
| WO | WO-2005/020356 A1 | 3/2005 |
| WO | WO-2005/117172 A2 | 12/2005 |
| WO | WO-2005/117172 A3 | 12/2005 |
| WO | WO-2005/124905 A1 | 12/2005 |
| WO | WO-2007/119132 A1 | 10/2007 |
| WO | WO-2008/032115 A1 | 3/2008 |

OTHER PUBLICATIONS

"High performance membrane-electrode assemblies with ultra-low Pt loading for proton exchange membrane fuel cells," L. Xiong et al. Electrochimica Acta 50 (2005), pp. 3200-3204.*

"A New Method for the Preparation of the Electrodes with Very Low Platinum Loading Used in Proton Exchange Membrane Fuel Cell", Zhi-gang Shao et al., Journal of Electrochemistry, 2000, vol. 6, Issue 3, pp. 317-323.*

"Improved Preparation Process of Very-Low-Platinum-Loading Electrodes for Polymer Electrolyte Fuel Cells," Makoto Uchida et al. J. Electrochem. Soc., vol. 145, No. 11, Nov. 1998, pp. 3708-3713.*

"High Performance Catalyzed Membranes of Ultra-low Pt Loadings for Polymer Electrolyte Fuel Cells," Mahlon S. Wilson et al. J. Electrochem. Soc., vol. 139, No. 2, Feb. 1992, pp. L28-L30.*

Mills, "Porous Platinum Morphologies: Platinised, Sponge and Black," *Platinum Metals Rev.*, 2007, vol. 51, No. 1, p. 52.

* cited by examiner

Figure 1
Particle Size Distribution from which a Processed Platinum Black layer is Prepared Figure 2
Particle mass distribution for catalyst layers #1-3

Figure 3
Reflectance Data for Catalyst Layer #1 compared to a layer prepared from platinum black

Figure 4

Effect of Anode Type on Cell Performance with Pure Oxygen on the Cathode (0.4mg(Pt)/cm² Cathode)

Figure 5
Effect of anode loading on Performance Vs. Relative

CATALYST LAYER

CROSS-REFERENCE TO RELATED APPLICATIONS

This application is the U.S. National Phase application of PCT International Application No. PCT/GB2008/050467, filed Jun. 19, 2008, and claims priority of British Patent Application No. 0711882.1, filed Jun. 20, 2007, both of which are incorporated herein by reference.

FIELD OF THE INVENTION

The present invention relates to a novel catalyst layer suitable for use in fuel cells and other electrochemical applications.

BACKGROUND OF THE INVENTION

A fuel cell is an electrochemical cell comprising two electrodes separated by an electrolyte. A fuel, e.g. hydrogen, an alcohol (such as methanol or ethanol), a hydride or formic acid, is supplied to the anode and an oxidant, e.g. oxygen or air, or other oxidant such as hydrogen peroxide is supplied to the cathode. Electrochemical reactions occur at the electrodes, and the chemical energy of the fuel and the oxidant is converted to electrical energy and heat. Electro catalysts are used to promote the electrochemical oxidation of the fuel at the anode and the electrochemical reduction of the oxidant at the cathode.

Fuel cells are usually classified according to their electrolyte: proton exchange membrane (PEM) fuel cells including hydrogen (including reformed hydrocarbon fuel) fuel cells, direct methanol fuel cells (DMFC), direct ethanol fuel cells (DEFC), formic acid fuel cells and hydride fuel cells; alkaline electrolyte fuel cells; phosphoric acid fuel cells (including hydrogen or reformed hydrocarbon fuel); solid oxide fuel cells (reformed or unreformed hydrocarbon fuel); and molten carbonate fuel cells (hydrogen and reformed hydrocarbon fuel).

In proton exchange membrane (PEM) fuel cells, the electrolyte is a solid polymeric membrane. The membrane is electronically insulating but ionically conducting. Proton-conducting membranes are typically used, and protons, produced at the anode, are transported across the membrane to the cathode, where they combine with oxygen to create water.

The principle component of a PEM fuel cell is known as a membrane electrode assembly (MEA) and is essentially composed of five layers. The central layer is the polymeric membrane. On either side of the membrane there is an electrocatalyst layer, containing an electrocatalyst, which is tailored for the different requirements at the anode and the cathode. Finally, adjacent to each electrocatalyst layer there is a gas diffusion layer. The gas diffusion layer must allow the reactants to reach the electrocatalyst layer, must allow products to be removed from the electrocatalyst layer, and must conduct the electric current that is generated by the electrochemical reactions. Therefore the gas diffusion layer must be porous and electrically conducting.

The electrocatalyst layer is generally composed of a metal, (such as a platinum group metal (platinum, palladium, rhodium, ruthenium, iridium and osmium), gold or silver, or a base metal) either unsupported in the form of a finely dispersed metal powder (a metal black) or supported on an electrically conducting support, such as high surface area carbon material. Suitable carbons typically include those from the carbon black family, such as oil furnace blacks, extra-conductive blacks, acetylene blacks and graphitized versions thereof. Exemplary carbons include Akzo Nobel Ketjen EC300J, Cabot Vulcan XC72R and Denka Acetylene Black. The electrocatalyst layers suitably comprise other components, such as ion-conducting polymer, which is included to improve the ionic conductivity within the layer. The electrocatalyst layers also comprise a certain volume fraction of porosity, which allows reactant ingress and product egress.

Figure 1:
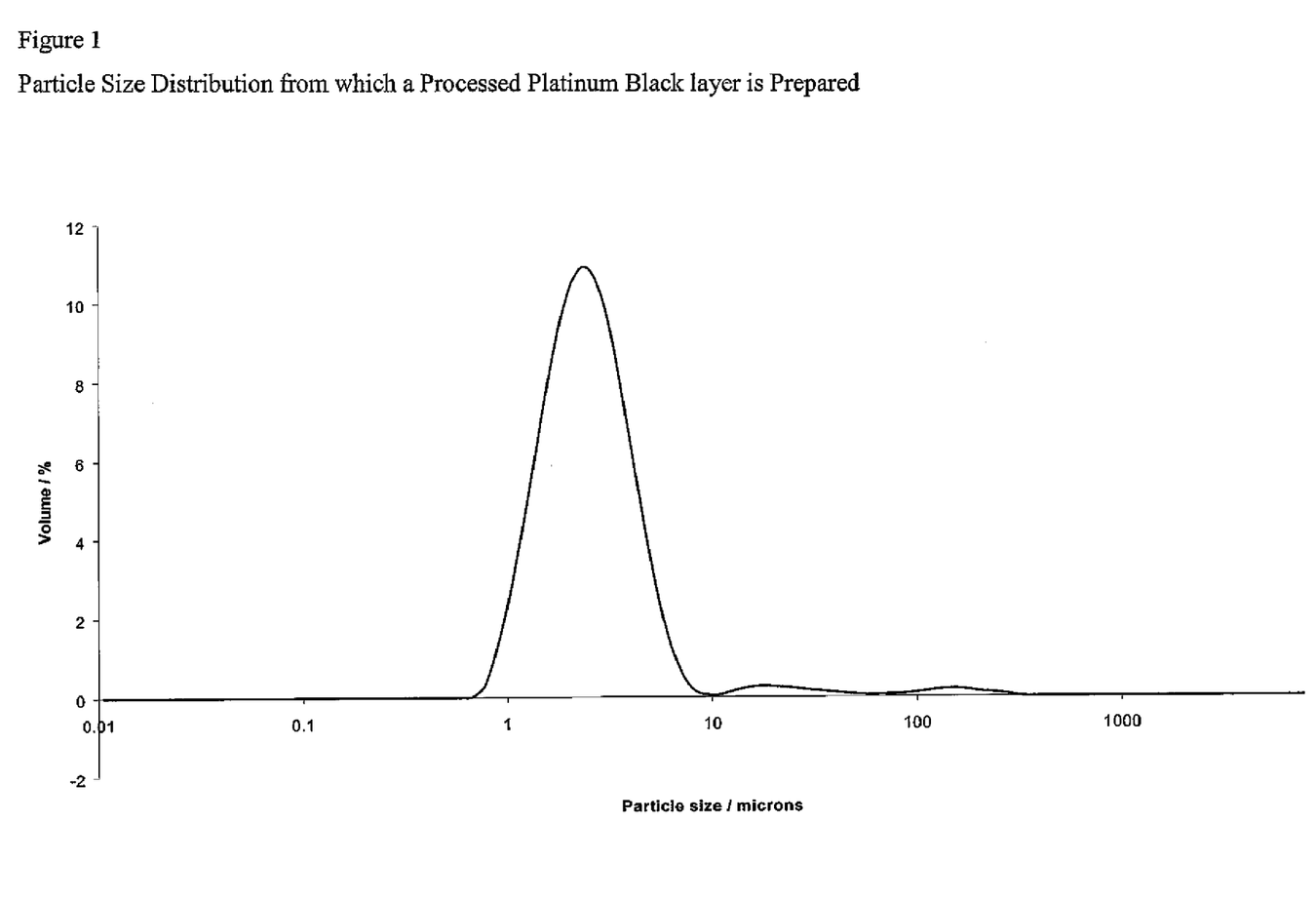
FIG. 1 shows an exemplary particle size distribution for a conventional Pt black.

Platinum black may also be used as a catalyst in a fuel cell anode or cathode. Platinum black is black-colored finely divided form of unsupported metallic platinum. Platinum blacks may be formed by a variety of methods including by heating ammonium chloroplatinate in molten sodium nitrate at 500° C. for 30 minutes. The molten mass is poured into water, followed by boiling and washing to give a muddy brown precipitate (thought to be platinum dioxide) that can be concentrated by centrifugation (*Platinum Metals Rev.* 2007, 51 (1), 52). Reduction of the suspension in water with gaseous hydrogen gives a black suspension with a particle size from which layers are made in the range of 0.5 µm to 10 µm (see FIG. 1). Typically, catalyst layers prepared from platinum black have a platinum loading of at least 1 mg/cm$^2$.

SUMMARY OF THE INVENTION

The manufacturers of fuel cells or fuel cell components are constantly seeking methods to improve the performance (or maintain the performance but at a lower cost) and durability of the components. Accordingly, it is the object of the present invention to provide an improved catalyst layer, suitable for use in a fuel cell, wherein the catalyst layer functions either as an electrocatalyst giving an increased performance or comparable performance but at a reduced platinum loading, or as a gas phase catalyst, for example as a selective oxidation catalyst, to remove impurities in the fuel stream produced when the hydrogen fuel is produced by converting a fossil fuel such as natural gas in a process such as reforming.

The present invention therefore provides a porous catalyst layer formed from discrete particles of unsupported metal, wherein at least 80%, suitably at least 90%, of the discrete particles have a mass of from 1 to 1000 zeptograms, and wherein the catalyst layer has a metal volume fraction of less than 30% and a metal loading of less than 0.09 mg/cm$^2$.

The mass of the discrete particles is measured by mass spectrometry, such methods being well known to those skilled in the art. Suitably, at least 80%, more suitably at least 90%, of the discrete particles have a mass of from 1 to 200 zeptograms.

Suitably, the discrete particles of unsupported metal are essentially spherical. By the term "essentially spherical", we mean that the longer axis is no more than twice the length of the shorter axes. Suitably, the longer axis is no more than one and a half times the length of the shorter axes and preferably the longer and shorter axes are essentially of similar lengths.

The metal volume fraction is suitably less then 30% and preferably less than 20%. A method for calculating the metal volume fraction would be well known to those skilled in the art, but can be calculated using the following method: (i) calculate the thickness that a solid metal layer would have at the correct metal loading; (ii) the volume fraction of metal in the layer is calculated from the measured catalyst layer thickness. The following formulae may be used:

Metal solid thickness=Metal loading (per $cm^2$)/density of Metal

Metal volume fraction=100×Metal solid thickness/Catalyst layer thickness

A typical example for a 150 nm thick platinum catalyst layer containing 0.02 $mg_{pt}$ $cm^{-2}$ is as follows:

Pt solid thickness=0.02×$10^{-3}$ g/21.45 g $cm^{-3}$=9.32× $10^{-7}$ cm=9.32 nm Pt volume fraction=100×9.32 nm/150 nm=6.21%

The loading of the total metal in the catalyst layer is suitably in the range of from 0.001 $mg/cm^2$ metal to 0.09 $mg/cm^2$ metal, suitably 0.005 $mg/cm^2$ metal to 0.09 $mg/cm^2$, and will depend on the ultimate use of the catalyst layer, for example whether it is to be used on the anode or cathode side of the fuel cell, and the type of fuel cell in which it is to be used, such as hydrogen fuel cell, direct methanol fuel cell, phosphoric acid fuel cell, etc.

In one preferred embodiment of the invention, the catalyst layer has a reflectance value (excluding specular contribution) of at least 4, suitably at least 5, more suitably at least 7, for example at least 9. The reflectance measurements may be carried out using methods known to those skilled in the art, and specifically using a Datacolour International Spectraflash 500 spectrophotometer.

The metal may be selected from the group consisting of a platinum group metal (platinum, ruthenium, palladium, rhodium, iridium and osmium), gold, silver or a base metal or an oxide, alloy or mixture thereof.

When used as the anode, particularly suitable metals include: Pt, and Pt alloyed or mixed with one or more metals or oxides thereof selected from the group consisting of Ru, Pd, Rh, Os, Sn, Bi, Pb, Ir, Mo, Sb, W, Au, Re; Pd and Pd alloyed or mixed with one or more metals or oxides thereof selected from the group consisting of Ru, Rh, Os, Sn, Bi, Pb, Ir, Mo, Sb, W, Au, Re; and alloys listed in WO2005/117172.

When used as the cathode, particularly suitable metals include: Pt, and Pt alloyed with one or more metals or oxides thereof selected from the group consisting of Ru, Rh, Ir, Pd, Ti, Cr, Mn, Fe, Co, Ni, Cu, V, Zr and Hf, Ta and Nb; and Pd alloyed with one or more metals of oxides thereof selected from the group consisting of Ru, Rh, Ir, Ti, Cr, Mn, Fe, Co, Ni, Cu, V, Zr and Hf, Ta and Nb.

The thickness of the catalyst layer will depend on a number of factors, for example, but not limited to, metal volume fraction, the metal being used, the metal loading, and the use of the catalyst layer. The required thickness would readily be determined by one skilled in the art, depending on the ultimate use of the catalyst layer. In one embodiment, very thin catalyst layers, for example less than 1 µm, such as less than 500 nm, in thickness, may be used.

The catalyst layer of the invention may also comprise one or more polymers, for example, an ionomer, such as a proton exchange polymer (e.g. a perfluorosulphonic acid polymer) or a hydrophobic polymer, such as PTFE. The presence of an ionomer will assist proton conduction when the catalyst layer is used as an electrocatalyst, and the presence of a hydrophobic polymer will help preserve gas permeability. The ionomer or hydrophobic polymer may be added during the metal deposition stage by adding a dispersion of the ionomer to an ink containing the metal particles or may be added later as a liquid dispersion or solution, some or all of which will penetrate into the catalyst layer. If the metal is deposited as a dry powder, the ionomer can also be deposited as a dry powder at the same time. Alternatively, ionomer may be incorporated into the catalyst layer during subsequent processing, for example during hot-pressing to form the MEA.

The catalyst layer of the invention may be prepared by a number of methods, but essentially zeptogram particles with masses in the range of 1-1000 zeptograms are first produced, and these particles are then deposited on a substrate. In one embodiment of the invention, the catalyst layer is formed using metal vapor deposition techniques to create the zeptogram particles required and to direct them toward a substrate. Other methods that could be adapted to produce zeptogram particles in the range required by the present invention will be known to those skilled in the art and include chemical methods (e.g. alcohol reduction, hydride reduction, micro-emulsion methods, chemical vapor deposition, electrochemical synthesis, photolysis and radiolysis, sonochemical synthesis and thermolysis), physical methods (e.g., supercritical fluids, metal vapor deposition, spray pyrolysis and plasma spray processing) and spray/thermal methods (e.g. spray pyrolysis, gas atomizer(spray gun) ultrasonic nebulizer, furnace pyrolysis, flame pyrolysis and light source used for pyrolysis).

The catalyst metal may also be co-deposited with a non-catalytic component (either metallic or non-metallic) which may or may not be subsequently removed by a thermal or chemical process. By controlling the ratio of the metal component to the non-catalytic component, the porosity and structure of the catalyst layer can be further controlled. Co-deposition with a non-catalytic component which is not subsequently removed may help contribute to the mechanical stability of the layer and help prevent sintering and/or agglomeration.

The catalyst layer of the invention may be applied to any suitable substrate.

In one embodiment of the invention, the catalyst layer may be applied to a gas diffusion layer to form a gas diffusion electrode (either anode or cathode). Therefore, a further aspect of the invention provides a gas diffusion electrode comprising a catalyst layer of the invention. One or more additional catalyst layers (for example Pt, PtRu) may subsequently be applied to the catalyst layer of the invention on the gas diffusion electrode to form an electrode having two or more catalyst layers (a multi-layered structure). The one or more additional catalyst layers may be a catalyst layer according to the invention or may be a conventional catalyst layer (e.g. a metal black or carbon-supported catalyst) as applied by conventional techniques, for example screen printing or spray coating. The catalyst layer of the invention may be either an electrocatalyst layer or a gas phase catalyst layer, such as a selective oxidation catalyst layer. In the case of a selective oxidation catalyst layer, the layer would be located closest to the gas diffusion layer and furthest from the membrane.

The gas diffusion layer onto which the catalyst layer is applied is suitably based on a conventional gas diffusion substrate known to those skilled in the art. Typical substrates include substrates based on carbon paper (e.g. Toray® paper available from Toray Industries, Japan or U105 or U107 paper available from Mitsubishi Rayon, Japan), woven carbon cloths (e.g. the MK series of carbon cloths available from Mitsubishi Chemicals, Japan) or non-woven carbon fiber webs (e.g. ELAT series of non-woven substrates available from E-TEK Inc, USA; H2315 series available from Freudenberg FCCT KG, Germany; or Sigracet® series available from SGL Technologies GmbH, Germany). The carbon paper, cloth or web is typically modified with a particulate material either embedded within the substrate or coated onto the planar faces, or a combination of both. The particulate material is typically a mixture of carbon black and a polymer such as polytetrafluoroethylene (PTFE). Suitably the gas diffusion layers are between 100 and 300 μm thick. Preferably there is a layer of particulate material such as carbon black and PTFE on the faces of the gas diffusion layers that contact the electrocatalyst layers. The gas diffusion layers may be flat or structured. By the term 'structured' we mean that it may be corrugated to add gas flow channels, convoluted or pre-roughened.

Alternatively, the substrate onto which the catalyst layer of the invention is applied may be a preformed gas diffusion electrode, either an anode or a cathode i.e. a gas diffusion layer (which may be as described above) which already has applied thereto a catalyst layer, which may be a catalyst layer of the invention or a conventional catalyst layer (e.g. a metal black or carbon-supported catalyst) as applied by conventional techniques, for example screen printing or spray coating. Again, a multi-layered structure will be obtained, with the final layer on the electrode being a catalyst layer of the invention.

In a further embodiment of the invention, the catalyst layer of the invention may also be applied to a membrane, for example an ion-conducting membrane. Accordingly, a further aspect of the invention provides a catalyst-coated membrane comprising a catalyst layer of the invention. One or more additional catalyst layers (for example Pt, PtRu) may subsequently be applied to the catalyst layer of the invention on the membrane to form a catalyst-coated membrane having two or more catalyst layers. The one or more additional catalyst layers may be a catalyst layer according to the invention or may be a conventional catalyst layer (e.g. a metal black or carbon-supported catalyst) as applied by conventional techniques, for example screen printing. In one embodiment, metal particles from the catalyst layer of the invention are embedded within the membrane, thus maximizing the membrane/catalyst layer interface interaction. The method of achieving this will depend on the method used for formation of the catalyst layer and would readily be determined by one skilled in the art. For example, the catalyst-coated membrane may be hot-pressed after formation, thus pressing some of the catalyst layer of the invention into the membrane. By controlling the hot-pressing conditions, more or less of the layer may be pressed into the membrane. Alternatively, if a route such as metal vapor deposition is used, the processing conditions may be altered such that particles of metal are embedded within the membrane during deposition of the catalyst layer.

Alternatively, the membrane onto which the catalyst layer of the invention is applied may be a preformed catalyst-coated membrane, the catalyst layer either being a layer of the invention or a conventional catalyst layer (e.g. a metal black or carbon-supported catalyst) as applied by conventional techniques, for example screen printing or spraying. Again, a multi-layered structure will be obtained, with the final layer on the catalyst-coated membrane being a catalyst layer of the invention. The catalyst layer of the invention may be either an electrocatalyst layer or a gas phase catalyst layer, such as a selective oxidation catalyst layer. In the case of a selective oxidation catalyst layer, the layer would be located closest to the gas diffusion layer and furthest from the membrane.

The membrane may be any membrane suitable for use in a fuel cell, for example the membrane may be based on a perfluorinated sulphonic acid material such as Nafion® (DuPont de Nemours), Flemion® (Asahi Glass) and Aciplex® (Asahi Kasei); these membranes may be used unmodified, or may be modified to improve the high temperature performance, or to improve the resistance to attack by peroxide degradation products for example by incorporating an additive. The membrane may be a composite membrane, containing the proton-conducting material and other materials that confer properties such as mechanical strength. For example, the membrane may comprise a proton-conducting membrane and a matrix of silica fibers, as described in EP 875 524 or the membrane may comprise an expanded PTFE web. Alternatively, the membrane may be based on a sulphonated hydrocarbon membrane such as those available from PolyFuel, JSR Corporation, FuMA-Tech GmbH and others. Alternatively, the membrane may be based on polybenzimidazole doped with phosphoric acid and include membranes from developers such as BASF Fuel Cell GmbH, for example the Celtec®-P membrane which will operate in the range 120° C. to 180° C. and other newer developmental membrane such as the Celtec®-V membrane. The catalyst layer of the invention is also suitable for use with membranes that use charge carriers other than protons, for example OH⁻ conducting membranes such as those available from Solvay Solexis S.p.A., FuMA-Tech GmbH. The membrane may be flat or structured. By the term 'structured' we mean that it may be convoluted or pre-roughened or have additional surface topographical features to increase the surface area of contact with the catalyst layer.

In a further embodiment of the invention, the substrate onto which the catalyst layer is applied is a transfer substrate. Accordingly, a further aspect of the present invention provides a transfer substrate comprising a catalyst layer of the invention. The transfer substrate may be any suitable transfer substrate known to those skilled in the art but is preferably a polymeric material such as polytetrafluoroethylene (PTFE) or polypropylene (especially biaxially-oriented polypropylene, BOPP) or a polyimide such as Kapton or a polymer-coated paper such as polyurethane coated paper. The transfer substrate could also be a silicone release paper or a metal foil such as aluminum foil. The catalyst layer of the invention may then be transferred to a gas diffusion substrate, gas diffusion electrode, membrane or catalyst coated membrane by techniques known to those skilled in the art.

In a further embodiment of the invention, the substrate onto which the catalyst layer of the invention is applied is a particulate material, e.g. a powder or fibrous material. Powder materials include carbon black, graphite, tungsten carbide, silicon and any other suitable powder. Suitable fibrous materials include, but are not limited to, fibers or nanofibers of carbon, metal or a suitable polymer. Preferably, the powder or fibrous substrate is electronically conducting but non-conducting substrates can be used provided the deposited catalyst forms a conducting layer over the surface of the substrate.

In a further embodiment, the catalyst layer of the invention may be applied to other substrates, for example a monolith, such as a carbon monolith (e.g. as described in WO2008/032115). Monoliths can be used to replace the flow field and gas diffusion layer in fuel cells, provided the wall of the monolith next to the catalyst layer is porous such that it can supply fuel or oxidant to and remove reaction products from the catalyst layer. The present invention allows for direct deposition of the catalyst layer onto such a monolith or application by use of a transfer medium.

The catalyst layer of the invention may also be used in cells wherein the electrolyte is held in a porous structure (hereinafter referred to as a separator) which serves to hold two electrodes apart and acts as a reservoir for a liquid electrolyte, for example a phosphoric acid fuel cell. Thus, in a further embodiment, the catalyst layer is applied to a separator, for example a silicon carbide matrix, which may or may not, have an electrode on one side of the separator.

In a further embodiment, the catalyst layer of the invention may be applied to a template, the template being designed to be removed following formation of the catalyst layer. Materials that can be removed by application of heat to cause decomposition such as polymers and other organic materials (polystyrene, methylcellulose, polypropylene carbonate etc), or that can be removed by sublimation such as ammonium carbonate are suitable, as are materials that can be chemically removed by dissolution or destruction such as sugars and salts, for example calcium carbonate, ammonium oxalate, lithium carbonate, aluminum oxide.

In a further embodiment, the substrate may be modified such that the catalyst layer is deposited in a patterned or textured manner. For example, the substrate may be a patterned or textured conductive substrate having a voltage directly applied thereto. The catalyst would deposit preferentially where the field is highest resulting in a patterned or textured catalyst layer. Alternatively, the substrate may be patterned with conducting and insulating regions and deposition would preferentially occur on the conducting regions. Alternatively, when the catalyst is dispersed in an aqueous or organic solvent based liquid, the substrate may be modified with hydrophobic material to direct deposition of the catalyst layer to certain regions. Other methods of modifying the substrate to create a textured or patterned catalyst layer will be known to or readily determined by one skilled in the art.

A further embodiment of the invention provides a membrane electrode assembly (MEA) comprising a catalyst layer of the invention. The MEA may be made up in a number of ways including, but not limited to:
 a) an ion-conducting membrane may be sandwiched between two gas diffusion electrodes (one anode and one cathode), at least one of which is an electrode according to the present invention;
 b) a catalyst-coated membrane coated on one side only by a catalyst layer may be sandwiched between (i) a gas diffusion layer and a gas diffusion electrode, the gas diffusion layer contacting the side of the membrane coated with the catalyst layer or (ii) two gas diffusion electrodes, and wherein at least one of the catalyst layers and the gas diffusion electrode(s) is according to the present invention;
 c) a catalyst-coated membrane coated on both sides with a catalyst layer may be sandwiched between (i) two gas diffusion layers, (ii) a gas diffusion layer and a gas diffusion electrode or (iii) two gas diffusion electrodes, and wherein at least one of the catalyst layer and the gas diffusion electrode(s) is according to the present invention.

The MEA may further comprise components that seal and/or reinforce the edge regions of the MEA for example as described in WO2005/020356. The MEA is assembled by conventional methods known to those skilled in the art.

The MEA may be used in a fuel cell stack, for example a proton exchange membrane fuel cell (PEMFC), a direct methanol fuel cell (DMFC), a high temperature fuel cell (for use at temperatures in the range of 100° C. to 250° C.) or an alkaline anion exchange membrane fuel cell. Accordingly, a further aspect of the invention provides a fuel cell comprising a MEA of the invention. The MEA may be incorporated into the fuel cell using conventional methods.

Alternatively, an electrode of the invention may be used directly in a liquid electrolyte fuel cell, for example a phosphoric acid fuel cell wherein the electrolyte is liquid phosphoric acid in a supporting matrix, for example silicon carbide or an alkaline fuel cell, wherein the electrolyte is typically a high concentration alkali, for example 6 M potassium hydroxide. Accordingly, a further aspect of the invention provides a fuel cell, in particular a phosphoric acid fuel cell, which comprises an electrode of the invention. Such fuel cells may be operated in the range of from 150° C. to 210° C.

The invention will now be further described with reference to the following examples, which are illustrative and not limiting of the invention.

Catalyst Layer Preparation

Three catalyst layers of the invention were prepared using a nanoparticle deposition system. Platinum was atomized using a magnetron sputter source. The atoms coalesced to form nanoparticles, which were directed towards a skived PTFE sheet substrate. The deposition conditions were varied to form three different catalyst layers on a PTFE substrate each with a different layer density, and each with a platinum loading of 0.02 mgPt/cm$^2$. The properties of the layers are shown in Table 1. The thicker layers have lower metal volume fractions and therefore more free porosity within them, which has been found to have a beneficial effect on the electrocatalytic behavior.

TABLE 1

Properties of platinum layers made by metal vapour deposition

| Layer | Pt loading (mgcm$^{-2}$) | Average Layer Thickness (nm) | Metal Volume Fraction (%) |
|---|---|---|---|
| #1 | 0.02 | 270 | 3.45 |
| #2 | 0.02 | 95 | 9.81 |
| #3 | 0.02 | 80 | 11.66 |

Figure 2:
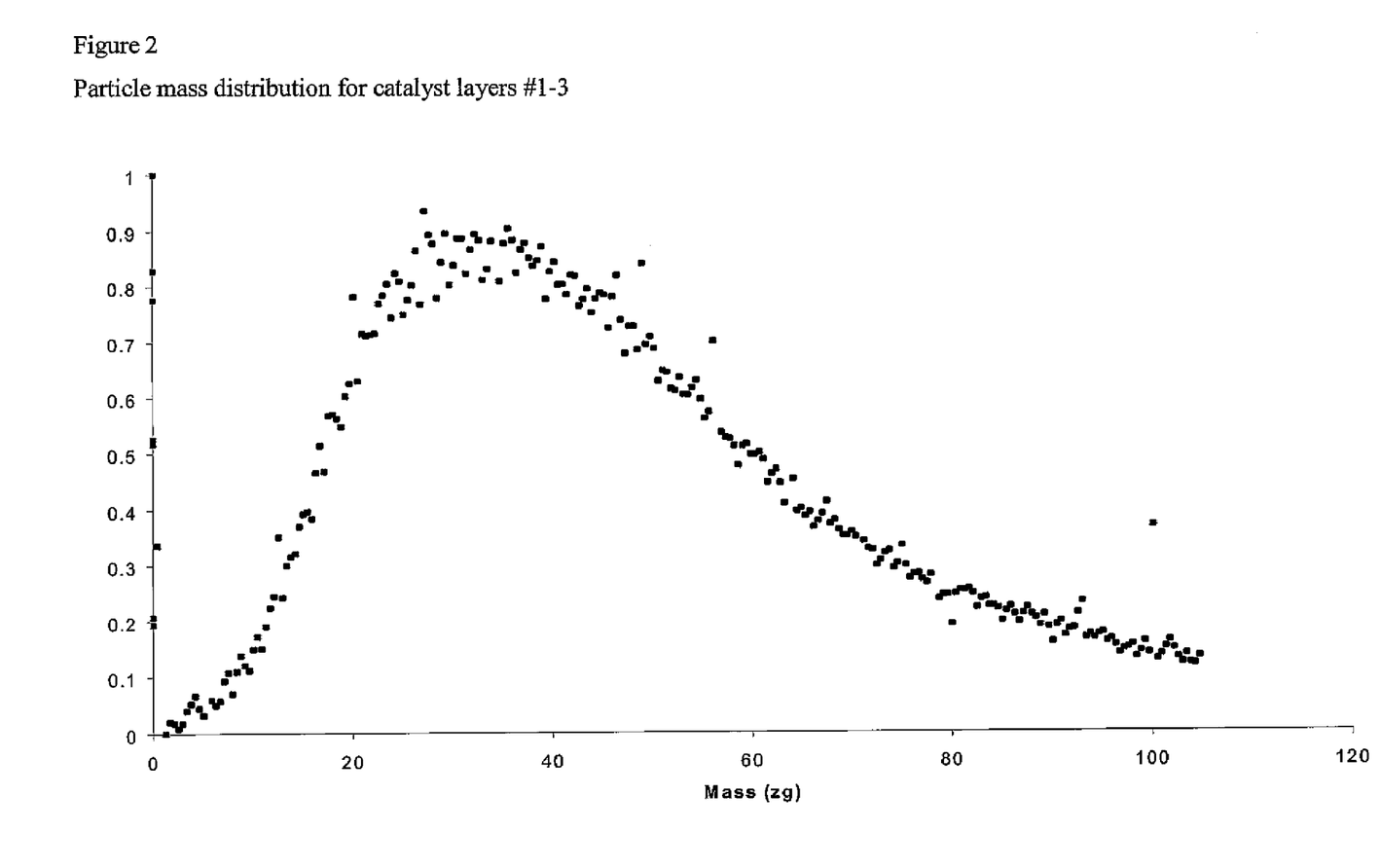
FIG. 2 shows the particle mass distribution of discrete Pt particles according to the invention after formation, but prior to being formed into a catalyst layer.

FIG. 2 shows the particle mass distribution of the discrete particles after formation, but prior to being formed into a catalyst layer. The modal mass of the particles is approximately 40 zeptograms (zg). Very few particles have a mass greater than 100 zg. The particles used in the layer of the invention are much smaller than those shown in FIG. 1 for a Pt black dispersion.

Figure 3:
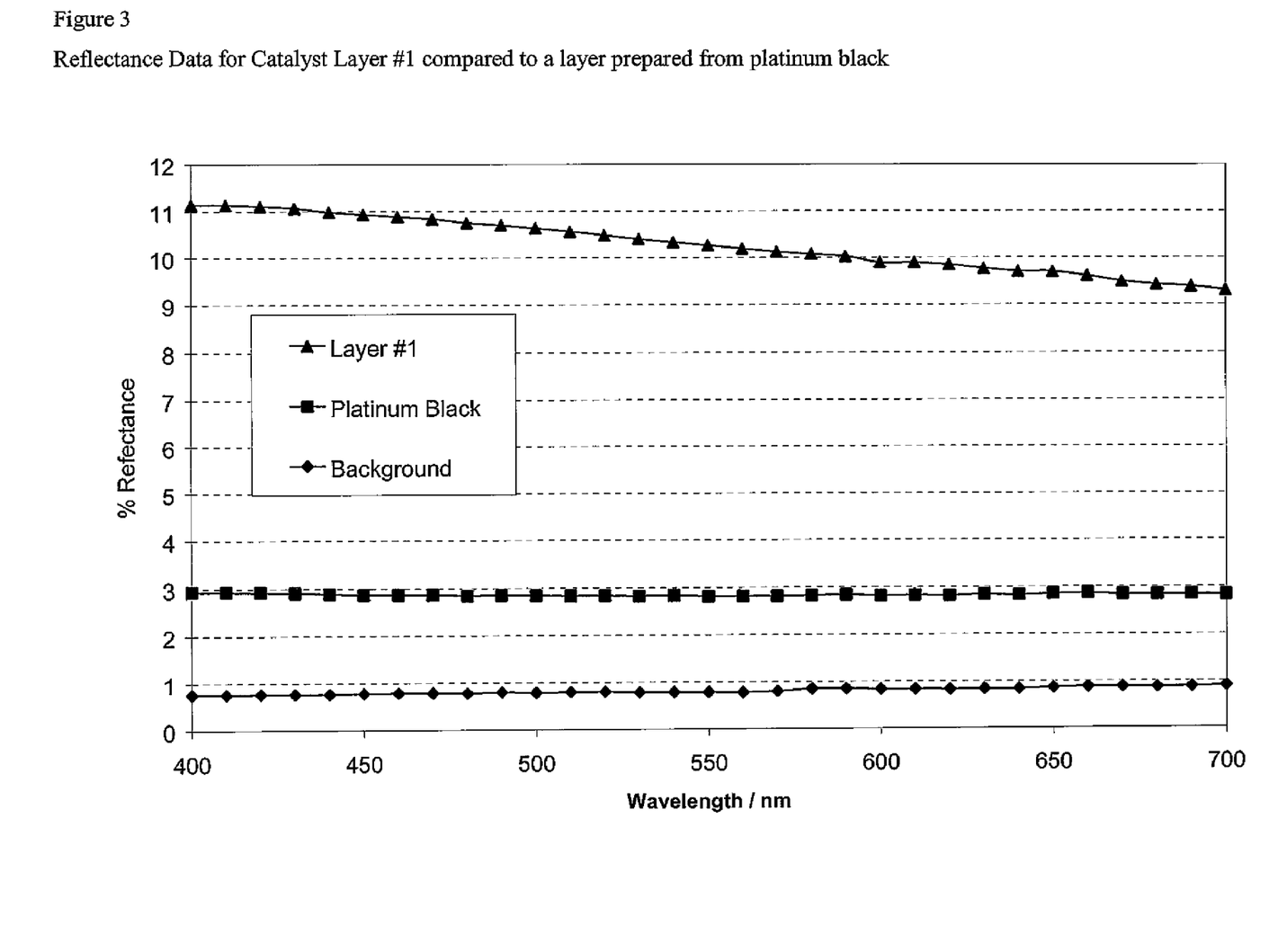
FIG. 3 shows reflectance data for a catalyst layer according to the invention, compared with a conventional Pt black catalyst layer and a background reflectance.

The reflectance of layer #1 formed by decal transfer from the PTFE sheet onto a commercially available polyfluorosulphonic acid membrane, available from Asahi Glass under the trade name SH-30, was measured and compared with the reflectance of a catalyst layer prepared from a platinum black. The reflectance measurements were carried out using a Datacolour International Spectraflash 500 spectrophotometer. The spectrophotometer was calibrated using a white standard tile and a black trap, both supplied by Datacolour International. The percentage reflectance was recorded in the range 400-700 nm, excluding the specular contribution. The samples were mounted on a black standard card (Ref 301/2A from Sheen Instruments, Teddington, UK), the reflectance of which was also measured (Background). The reflectance data is shown in FIG. 3 and shows a much higher reflectance from the catalyst layer #1 than measured on the comparative Pt black-based catalyst layer.

Catalyst-Coated Membrane Preparation

Three catalyst-coated membranes (CCMs) were prepared from each of the three catalyst layers prepared above. The catalyst layer was transferred from the PTFE substrate to one side of a commercially available polyfluorosulphonic acid membrane (30 μm thickness) available from Asahi Glass under the trade name SH-30 by a decal transfer process at a temperature of 150° C. and pressure of 400 psi. A conventional carbon black-supported platinum catalyst (0.4 mgPt/cm$^2$) with added Nafion 1100EW ionomer, at a loading of 90% with respect to the weight of carbon, was applied to the second side of the membrane by decal transfer under the same conditions.

MEA Preparation and Performance Testing

Figure 4:
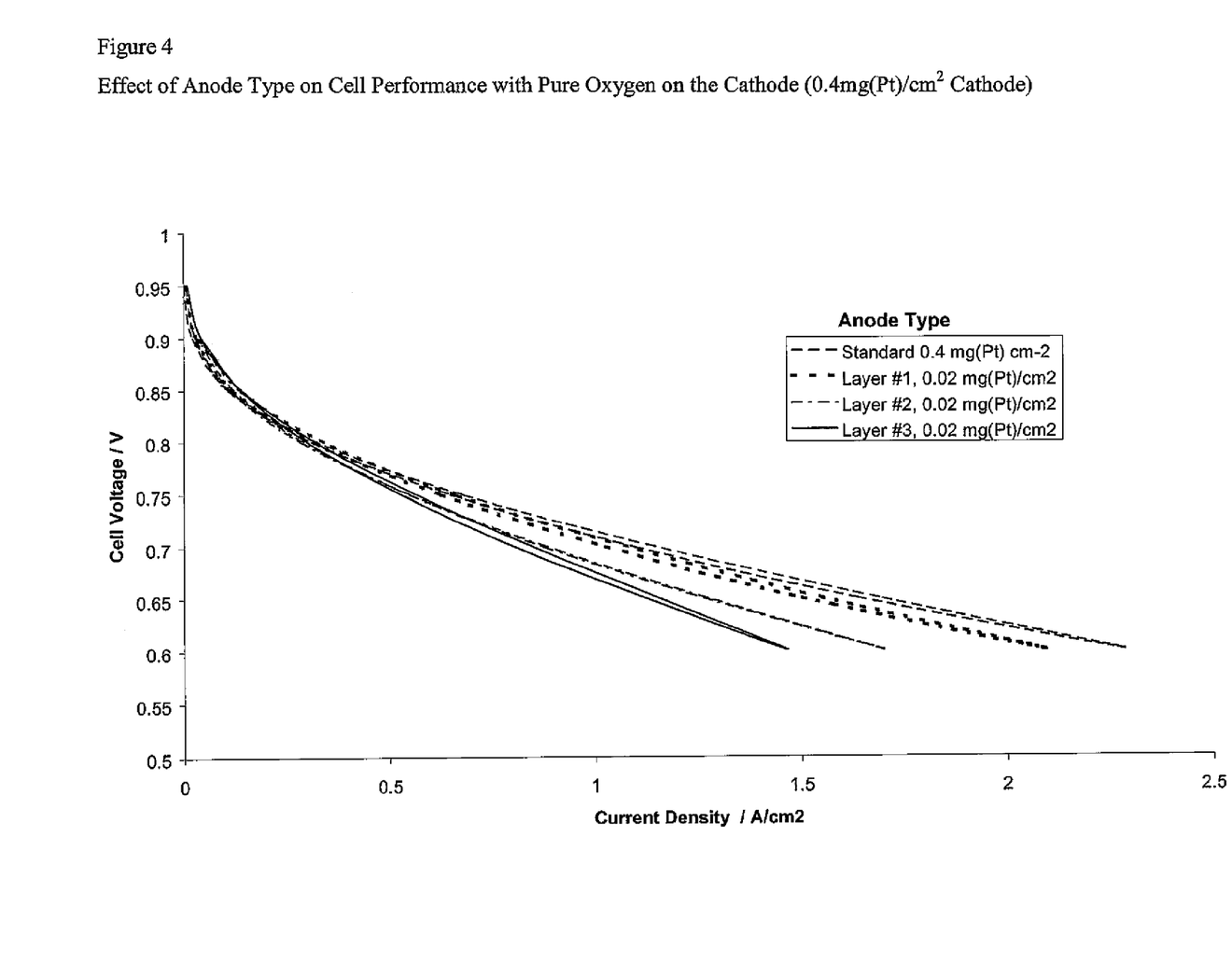
FIG. 4 shows performance plots of voltage vs. current density for three anodes prepared with catalyst layers according to the invention, compared with an anode using a conventional catalyst layer.

Each CCM prepared above was assembled with two gas diffusion layers (Toray TGP-H-60 coated with a Carbon-PTFE microporous layer), one gas diffusion layer placed on either side of the CCM. The layers were compressed into a 3.14 cm$^2$ single cell for fuel cell performance testing with the catalyst layers of the invention being the anode. The cell was operated with pure $H_2$ on the anode and pure $O_2$ on the cathode at 80° C., the gases being humidified with a dewpoint of 80° C. (i.e. fully humidified). The MEAs using the catalyst layers of the invention were compared with a cell having standard catalyst layers on both the anode and cathode at a platinum loading of 0.4 mgPt/cm$^2$. FIG. 4 demonstrates the performance obtained when the catalyst layer of the invention is the anode. The activity of the MEAs of the invention is comparable to that of the standard MEA but at a much lower platinum loading.

Effect of Anode Catalyst Layer on Performance Vs. Relative Humidity

Figure 5:
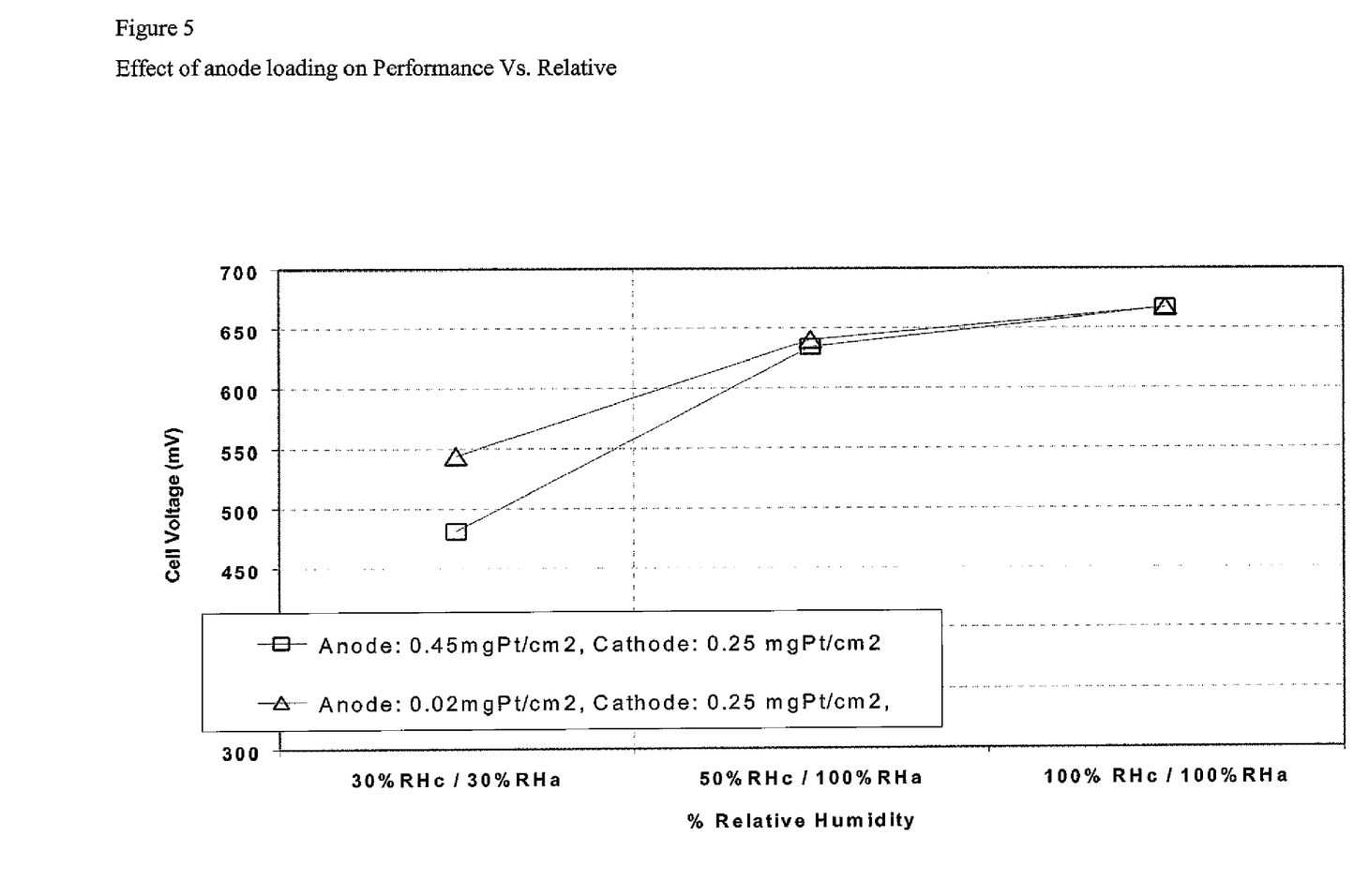
FIG. 5 shows cell voltages under several relative humidity conditions for a catalyst layer according to the invention compared with a conventional catalyst layer.

CCMs and MEAs were prepared as described above from a catalyst layer prepared in the same way as Layer #1 in Table 1, but with a 50 cm$^2$ active area and mounted in single cell hardware and tested at 80° C., 50 kPa gauge with $H_2$ and air stoichiometries both of 2.0. Polarization curves were measured under 3 different humidity conditions on anode/cathode: 100/100%, 100/50% and 30/30% relative humidity. The results shown in FIG. 5 record the cell voltages obtained at a current density of 1.0 Acm$^{-2}$ at the three different conditions. This demonstrates that the anode of the invention with only 0.02 mgPt/cm$^2$ behaves very similarly to a carbon supported anode with 0.4 mgPt/cm$^2$ at 100/100% and 100/50%, but under the dry conditions of 30/30% relative humidity, the layer of the invention gives a 60 mV improvement at 1 A/cm$^2$. It therefore appears that a further benefit is that the catalyst layer of the invention allows less drying of the MEA than a conventional layer.

The invention claimed is:

1. A porous catalyst layer formed from discrete particles of unsupported metal, wherein at least 80% of the discrete partcles have a mass of from 1 to 1000 zeptograms, and wherein the catalyst layer has a metal volume fraction of less than 30% and a metal loading of from 0.001 mg/cm$^2$ to 0.09 mg/cm$^2$.

2. A porous catalyst layer according to claim 1, wherein at least 80% of the discrete particles have a mass of from 1 to 200 zeptograms.

3. A porous catalyst layer according to claim 1, wherein the metal is selected from the group consisting of platinum, ruthenium, palladium, rhodium, iridium, osmium, gold, silver, base metal, and oxides, alloys and mixtures thereof.

4. A porous catalyst layer according to claim 3, wherein the metal is platinum.

5. A porous catalyst layer according to claim 1, wherein the catalyst layer further comprises one or more polymers.

6. A porous catalyst layer according to claim 5, wherein the polymer is an ionomer.

7. A porous catalyst layer according to claim 5, wherein the polymer is a hydrophobic polymer.

8. A gas diffusion electrode comprising a porous catalyst layer as claimed in claim 1.

9. A fuel cell comprising an electrode as claimed in claim 8.

10. A catalyst coated membrane comprising a porous catalyst layer as claimed in claim 1.

11. A catalyst coated membrane according to claim 10, wherein metal particles from the catalyst layer are embedded within the membrane.

12. A transfer substrate comprising a porous catalyst layer as claimed in claim 1.

13. A membrane electrode assembly comprising a catalyst layer as claimed in claim 1.

14. A fuel cell comprising a membrane electrode assembly as claimed in claim 13.

* * * * *